(12) United States Patent
Frea et al.

(10) Patent No.: US 11,305,795 B2
(45) Date of Patent: Apr. 19, 2022

(54) METHODS FOR ASSESSING CONTAMINATION AND CLEANING OF A RAIL, IN PARTICULAR FOR A RAILWAY VEHICLE

(71) Applicant: FAIVELEY TRANSPORT ITALIA S.p.A., Piossasco (IT)

(72) Inventors: Matteo Frea, Turin (IT); Luc Imbert, Turin (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 306 days.

(21) Appl. No.: 16/620,909

(22) PCT Filed: Jun. 12, 2018

(86) PCT No.: PCT/IB2018/054224
§ 371 (c)(1),
(2) Date: Dec. 10, 2019

(87) PCT Pub. No.: WO2018/229638
PCT Pub. Date: Dec. 20, 2018

(65) Prior Publication Data
US 2020/0101993 A1   Apr. 2, 2020

(30) Foreign Application Priority Data
Jun. 12, 2017   (IT) .................. 102017000064371

(51) Int. Cl.
*B61L 23/04*   (2006.01)
*B60L 3/10*   (2006.01)
(Continued)

(52) U.S. Cl.
CPC ............... *B61L 23/04* (2013.01); *B60L 3/10* (2013.01); *B60T 8/172* (2013.01); *B60T 8/1705* (2013.01);
(Continued)

(58) Field of Classification Search
CPC ........ B61L 23/04; B61L 15/0072; B60L 3/10; B60L 2200/26; B60L 2240/64;
(Continued)

(56) References Cited

U.S. PATENT DOCUMENTS 7,027,900 B2 *   4/2006   Kumar ................... B61C 15/14
                                                                180/197
9,493,143 B2 *   11/2016   Cooper .................. B61L 25/02
(Continued)

FOREIGN PATENT DOCUMENTS

DE   102006057813 A1   6/2008
DE   102010049303 A1   4/2012
(Continued)

OTHER PUBLICATIONS

International Search Report, issued in PCT/IB2018/054224, dated Sep. 19, 2018, Rijswijk, Netherlands.

*Primary Examiner* — Zachary L Kuhfuss
(74) *Attorney, Agent, or Firm* — Will Breeze; The Small Patent Law Group LLC

(57) ABSTRACT

A method for assessing contamination of a rail, in particular for a railway vehicle, comprises the steps of imposing a first sliding value lower than a first threshold between the wheels of a first controlled axle and the rail, the first controlled axle being the head axle of the railway vehicle, imposing a second sliding value greater than a second threshold between the wheels of a second controlled axle and the rail, the second axle following the first axle and the second threshold being greater than the first threshold, and determining the trend of an adhesion curve between the wheels belonging to a plurality of controlled axles and the rail, based on a first adhesion value between the wheels of the first axle and the rail, and a second adhesion value between the wheels of the second axle and the rail.

9 Claims, 7 Drawing Sheets

(51) Int. Cl.
*B60T 8/17* (2006.01)
*B61L 15/00* (2006.01)
*B61C 15/00* (2006.01)
*B60T 8/172* (2006.01)
*B60T 17/22* (2006.01)

(52) U.S. Cl.
CPC .......... *B61C 15/00* (2013.01); *B61L 15/0072* (2013.01); *B60L 2200/26* (2013.01); *B60L 2240/64* (2013.01); *B60T 17/228* (2013.01); *B60T 2210/12* (2013.01)

(58) Field of Classification Search
CPC .......... B60T 2210/12; B60T 2270/406; B60T 8/172; B60T 8/1705; B60T 8/17616; B60T 17/228; Y02T 10/72; Y02T 90/16; B61C 15/00; B61C 15/14
See application file for complete search history.

(56) References Cited

U.S. PATENT DOCUMENTS

| | | | |
|---|---|---|---|
| 10,464,538 B2* | 11/2019 | Rasel | B60T 8/17616 |
| 10,780,904 B2* | 9/2020 | Tione | B61L 3/006 |
| 2005/0065701 A1* | 3/2005 | Kumar | B61C 15/14 701/82 |
| 2007/0001629 A1* | 1/2007 | McGarry | B61C 15/14 318/52 |
| 2014/0058570 A1* | 2/2014 | Kumar | B61C 17/12 700/283 |
| 2014/0371959 A1* | 12/2014 | Kumar | B60T 13/665 701/20 |
| 2019/0001822 A1* | 1/2019 | Tione | B60T 17/228 |
| 2019/0111951 A1* | 4/2019 | Tione | B61L 3/008 |
| 2020/0101993 A1* | 4/2020 | Frea | B61C 15/00 |

FOREIGN PATENT DOCUMENTS

| | | |
|---|---|---|
| DE | 102015116862 A1 | 4/2017 |
| EP | 0826548 A1 | 3/1998 |
| EP | 2147840 A1 | 1/2010 |
| EP | 2813409 A1 | 12/2014 |
| WO | 2006113954 A | 11/2006 |
| WO | 2013034714 A2 | 3/2013 |

* cited by examiner

METHODS FOR ASSESSING CONTAMINATION AND CLEANING OF A RAIL, IN PARTICULAR FOR A RAILWAY VEHICLE

CROSS-REFERENCE TO RELATED APPLICATIONS

This application is a National Phase filing of PCT International Application No. PCT/IB2018/054224, having an International Filing Date of Jun. 12, 2018, claiming priority to Italian Patent Application No. 102017000064371, having a filing date of Jun. 12, 2017 each of which is hereby incorporated by reference in its entirety.

FIELD OF THE INVENTION

The present invention relates to methods for controlling the adhesion value between the wheels of a railway vehicle and a rail. In particular, the present invention relates to methods for assessment of contamination and cleaning of a rail, in particular, for a railway vehicle.

BACKGROUND OF THE INVENTION

Electronic systems are installed on board most modern rail vehicles, which typically include wheel skid control subsystems, intended to intervene both when the vehicle is in the traction phase and when it is in the braking phase. These subsystems are known as anti-skid or anti-slide systems, or also WSP (Wheel Slide Protection) systems.

A system for controlling the adhesion of the wheels, as an anti-skid function, according to the prior art, is schematically represented in FIG. 1 of the accompanying drawings, which refers to a vehicle with n controlled axles $A_1$, $A_2$, ..., $A_n$. The axles $A_1$, $A_2$, ..., $A_n$ comprise a respective shaft $S_1$, $S_2$, ..., $S_n$ and a respective wheelset $W_1$, $W_2$, ..., $W_n$ integral in rotation thereto.

In the drawings, only one wheel of each axle is generally illustrated.

The WSP system of FIG. 1 comprises an electronic control unit ECU, typically based on a microprocessor architecture that receives tachometer signals relating to the angular velocity of each axle $A_1$, $A_2$, ... $A_n$ from detectors $SS_1$, $SS_2$, ..., $SS_n$ respectively associated with such axles. The electronic control unit ECU is also connected to the torque control apparatuses $TC_1$, $TC_2$, ..., $TC_n$, each associated with a respective axle $A_1$, $A_2$, ..., $A_n$.

The electronic control unit ECU is arranged to carry out a modulation of the torque applied to each axle according to a predetermined algorithm if, in the case of applying torque during traction or braking in a degraded adhesion situation, the wheels of one or more axles end up in a possible incipient skidding condition. Torque modulation is implemented in such a way as to prevent a total locking of the axles, possibly so as to bring each axle into a situation of controlled sliding with the intention of recovering adhesion and, in any case, for the entire duration of the degraded adhesion situation.

In FIG. 2, the curves 1, 2 and 3 qualitatively represent the trend of the adhesion according to the ambient conditions: curve 1 corresponds to an adhesion condition in dry contact conditions between the wheels and rails, curve 2 corresponds to an adhesion condition in the presence of moisture between the wheels and rails, and curve 3 represents an adhesion condition in presence of viscous material between the wheels and rails, such as oil or rotten leaves (typical condition in the autumn period), or even rust mixed with moisture (typical condition in railway depots).

It has been found experimentally that the values of δ at the adhesion peaks $a_1$, $a_2$, $a_3$ vary with the change in the adhesion conditions, moving along a curve as indicated at A in FIG. 2.

FIG. 3 is a diagram illustrating forces applied to an axle's wheel A. From this figure it is clear that:

$$F_m \cdot R = F_A \cdot R - J \cdot \dot{\omega} \quad (2)$$

where:

$$F_A = \mu \cdot m \cdot g \quad (3)$$

whereby:

$$F_m = \mu \cdot m \cdot g - J/R \cdot \dot{\omega} \quad (4)$$

where $F_m$ is the tangential force applied to a wheel by the traction and/or braking system, R is the radius of the wheel, J is the moment of inertia of the axle, m is the mass resting on the wheel-rail contact point, $\dot{\omega}$ is the instantaneous angular acceleration of the axle.

It is clear that, at the same instantaneous angular acceleration, the maximum applicable force $F_m$ is obtained at the maximum adhesion value μ, i.e. at the points lying on the curve A of FIG. 2.

If one decides to slide the axle in conditions such as those corresponding, for example, to point b in FIG. 2, the value of the force $F_m$ available is reduced as a result of the reduction of the adhesion value μ, but an energy injection phenomenon is obtained at the wheel-rail point of contact, proportional to the sliding (difference) between the velocity of the vehicle $V_v$ and the tangential velocity $V_r$ of the wheel, with a power (energy injected per unit of time):

$$P(\delta) = F_A(\delta) \cdot (V_v - V_r) = \mu(\delta) \cdot m \cdot g \cdot (V_v - V_r) = \mu(\delta) \cdot m \cdot g \cdot \delta \cdot V_v. \quad (5)$$

The expression (5) above indicates how an increase of the power applied to the wheel-rail contact point is obtained by increasing δ. This injection of energy causes an overheating of the wheel with a consequent cleaning effect of the point of contact, improving the instantaneous adhesion value μ for the next wheel.

It is moreover known that significant cleaning effects are obtained in case of moisture or rain, while in presence of lubricants or rotten leaves, the cleaning effect is less pronounced.

The current systems for recovering adhesion between wheels and rails impose a fixed sliding value δ, typically between 0.2 and 0.3, the specific value being calibrated in a definitive way during the vehicle approval tests. The selected value of δ is therefore optimized for the type of lubricant used to cause the condition of skidding during the tests, as prescribed, for example, in EN 15595:2009+A1, Railway Applications-Braking-Wheel Slide Protection, para. 6.4.2.1, and is, on the other hand, not optimal for all types of materials that may cause conditions of skidding during the normal service of the vehicle.

The graph of FIG. 4A shows in a qualitative way how the peak of the global adhesion of a vehicle with four axles varies with the change in δ. There is practically no cleaning factor by bringing all the axles to slide with adhesion corresponding to the value $δ_1$, as in FIG. 4A; therefore the four adhesion curves corresponding to the four wheels substantially coincide with each other and each axle takes advantage of the maximum peak adhesion value $μ(δ_1)$.

If, on the other hand, one brings the axles to slide with an adhesion corresponding to the slide $δ_2$ as in FIG. 4B, a high cleaning factor will be obtained. Only the $\mu_1$ curve corresponding to the first axle of the vehicle (in the direction of travel) will remain unchanged and equivalent to that of FIG. 4A, while the curves corresponding to the following axles will have increasing adhesion values due to the cleaning effect achieved by the previous axle. The value $\mu(\delta_2)$ for each axle is indeed lower than the corresponding value $\mu(\delta_1)$.

As qualitatively shown in FIG. 4C, in the range $\delta_1 \leq \delta \leq \delta_2$, a peak average global adhesion value $\bar{\mu} = \Sigma_1^n \mu(\delta)/n$ (6) exists.

The above also applies to a vehicle or train with n axles.

Since the curves which express the adhesion u as a function of the sliding $\delta$ may not be formulated mathematically in an analytical way and vary continuously with the change in the conditions that cause skidding, the geometry of the contact point, and the external ambient conditions, it is not possible a priori, to calculate analytically the optimal sliding value $\delta$.

However, an excellent adhesion control and possible recovery system should be able to analyze the instantaneous adhesion conditions in real time and verify the trend thereof with the change in $\delta$ and identify the value of $\delta$ such as to maximize $\bar{\mu} = \Sigma_1^n \mu(\delta)/n$. Such value, which is the value that minimizes the stopping distance in the event of braking in a degraded adhesion condition, allows the maximum adhesion recovery in case of skidding.

In order to obviate the disadvantages described above, WO2006/113954A describes a slide control for railway vehicles, implemented continuously over time, which requires the identification, in optimal adhesion conditions, of the parameters necessary in view of the subsequent desired performance in skid conditions. Such method further requires the overall deceleration of the system to be known.

Furthermore, the process of adjusting the optimum sliding values requires significantly long times. This adjustment process being implemented at the beginning of a skidding phase, i.e. when the vehicle is traveling at high speed, the distance covered by the latter is increased considerably.

In addition, the processes and systems realized according to the prior art are based on the assumption that the wheel adhesion curves are always curves having an adhesion peak $\mu_p$ at small sliding values, for example on the order of 1-2%.

Wheel adhesion curves are not always curves having an adhesion peak $\mu_p$ at small sliding values; they may be curves having an adhesion peak $\mu_p$ at higher sliding values, such as values on the order of 20-25%.

Consequently, if one erroneously acts as if the curve is a curve having an adhesion peak $\mu_p$ at small sliding values, that is, a small sliding value is imposed between the wheels and the rails to obtain peak wheel adhesion, the desired benefit is not achieved. In effect, in small slides, this curve, having an adhesion peak of $\mu_p$ at higher sliding values, such as, for example, values on the order of 20-25%, exhibits poor levels of adhesion and poor rail cleaning effects (given that the slide imposed is low).

Therefore, the average adhesion value, considering every single adhesion value of the wheels, will not be the optimal one.

SUMMARY OF THE INVENTION

An object of the present invention is to propose a method for assessing the contamination of a rail which allows to determine the position of the adhesion peak along the adhesion curve of the wheels belonging to a plurality of controlled axles of a vehicle and, consequently, to obtain improved control and possible recovery of the adhesion of the wheels of a controlled axle of a railway vehicle, and for better assessing the cleaning effect among various successive axles of a railway vehicle.

The aforesaid objects and other advantages are achieved, according to an aspect of the present invention, by a method for assessing contamination and cleaning of a rail having the features described and claimed herein. Preferential embodiments of the invention are also described.

Further features and advantages of the present invention will become apparent from the detailed description that follows, provided by way of non-limiting example with reference to the drawings.

DETAILED DESCRIPTION

Figure 1:
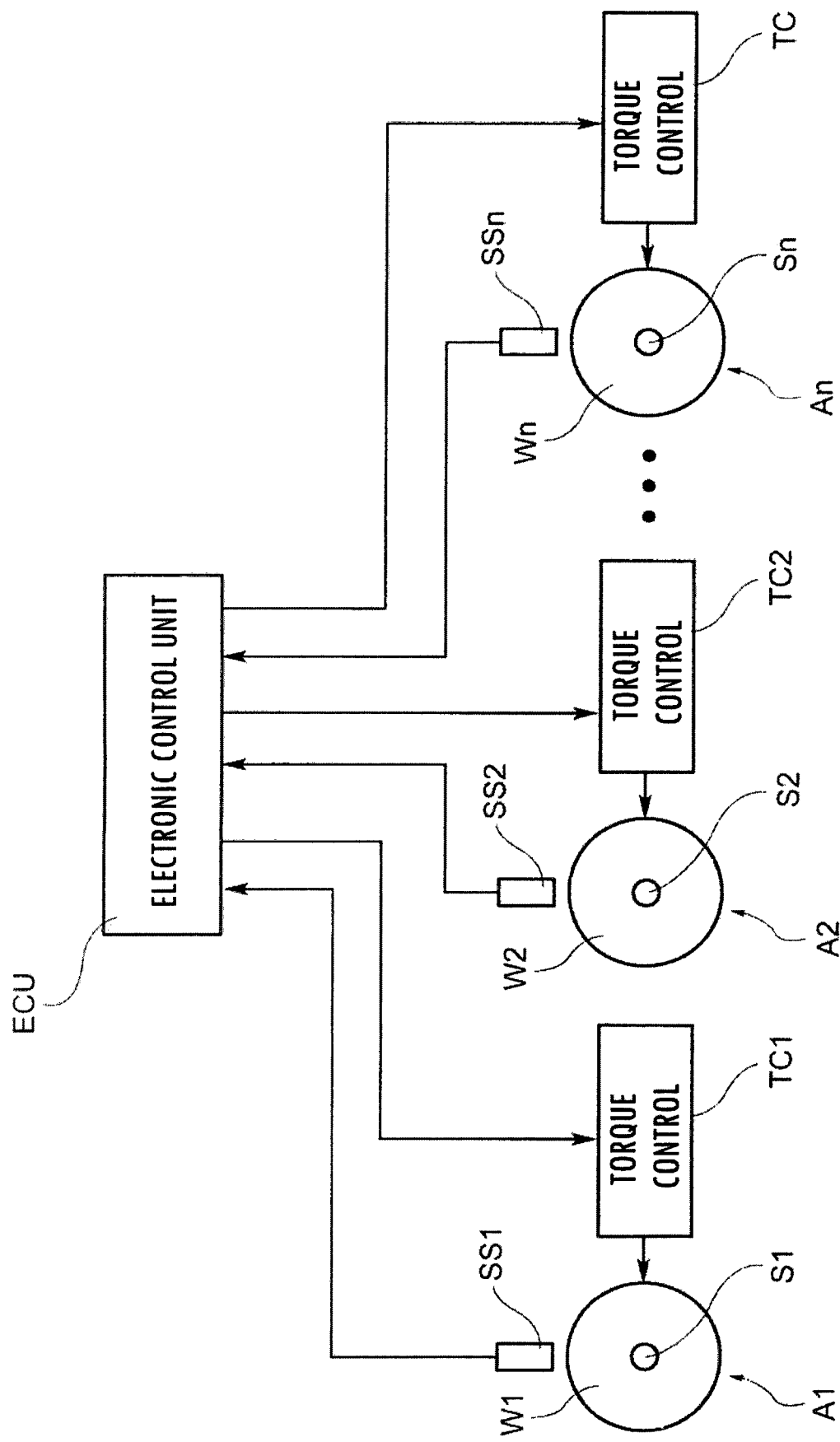
FIG. 1 is a block diagram of an anti-skid control system of the wheels of a railway vehicle.
Figure 2:
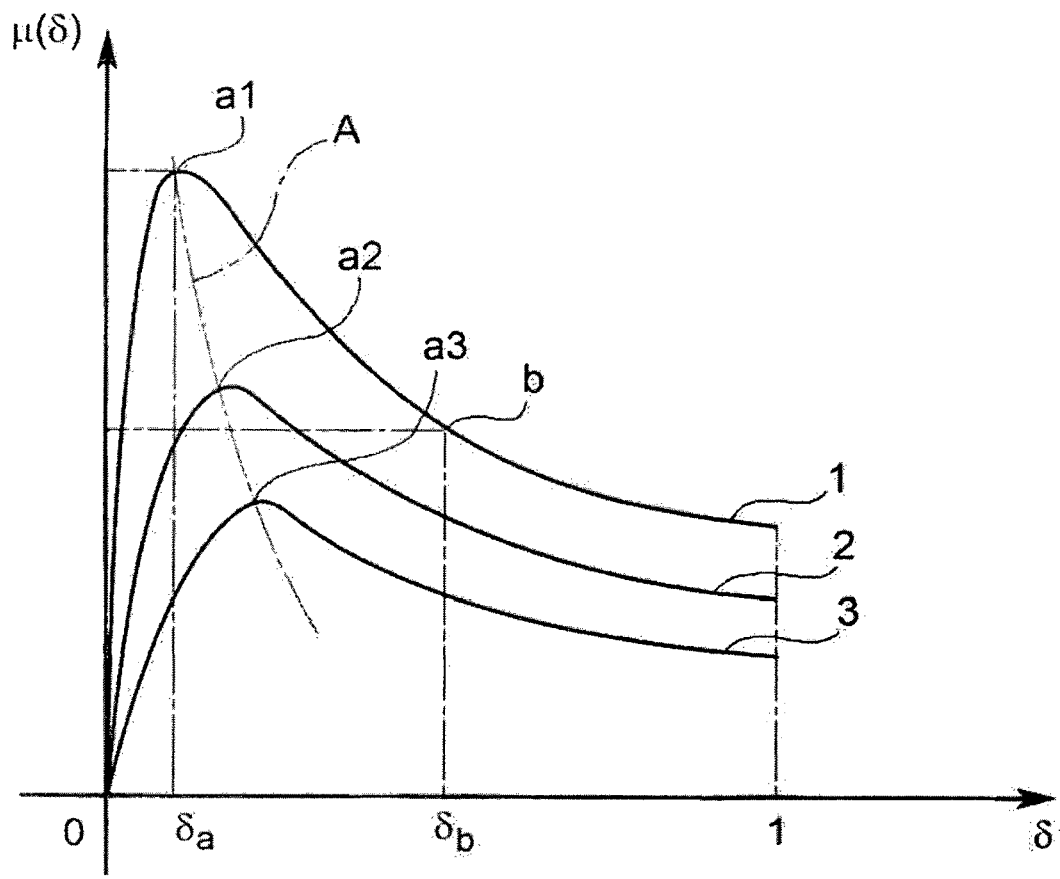
FIG. 2 is a graph showing qualitatively the trend of the adhesion coefficient $\mu$ of the wheels of an axle, shown on the y-axis, as a function of the sliding $\delta$, shown on the x-axis.
Figure 3:
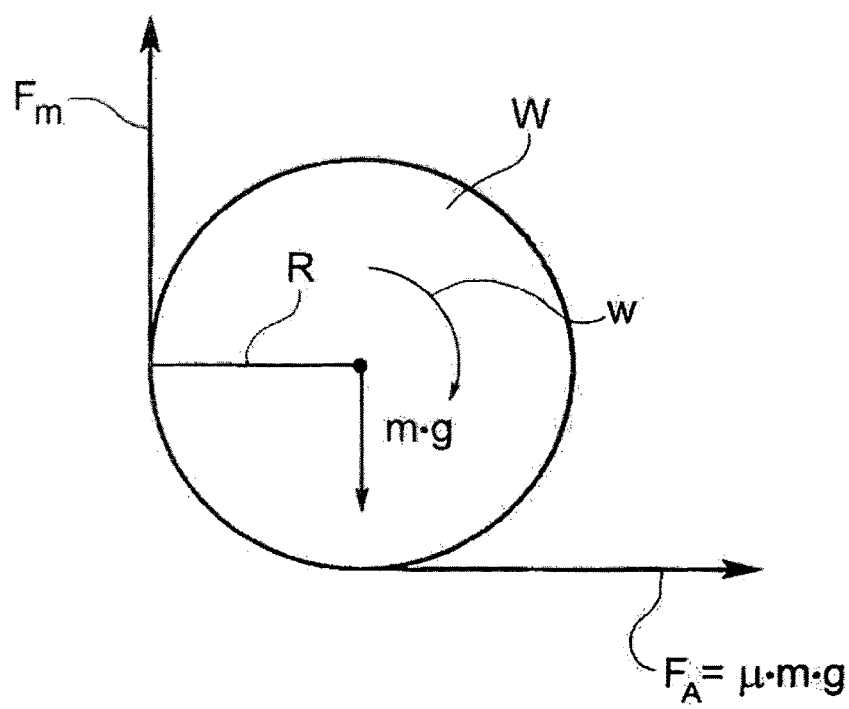
FIG. 3 is a diagram illustrating the forces applied to an axle's wheel.
Figure 4A:
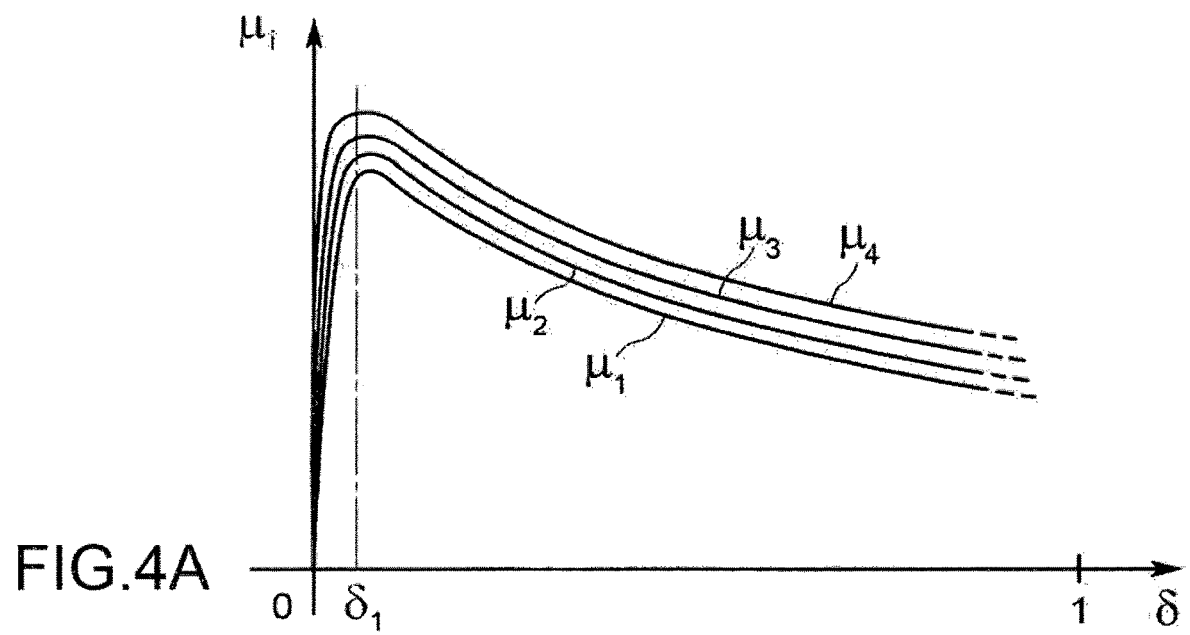
FIGS. 4A, 4B are graphs showing qualitatively the trends of the adhesion coefficient $\mu$ of the wheels of four axles of a vehicle in two different operating conditions.
Figure 4B:
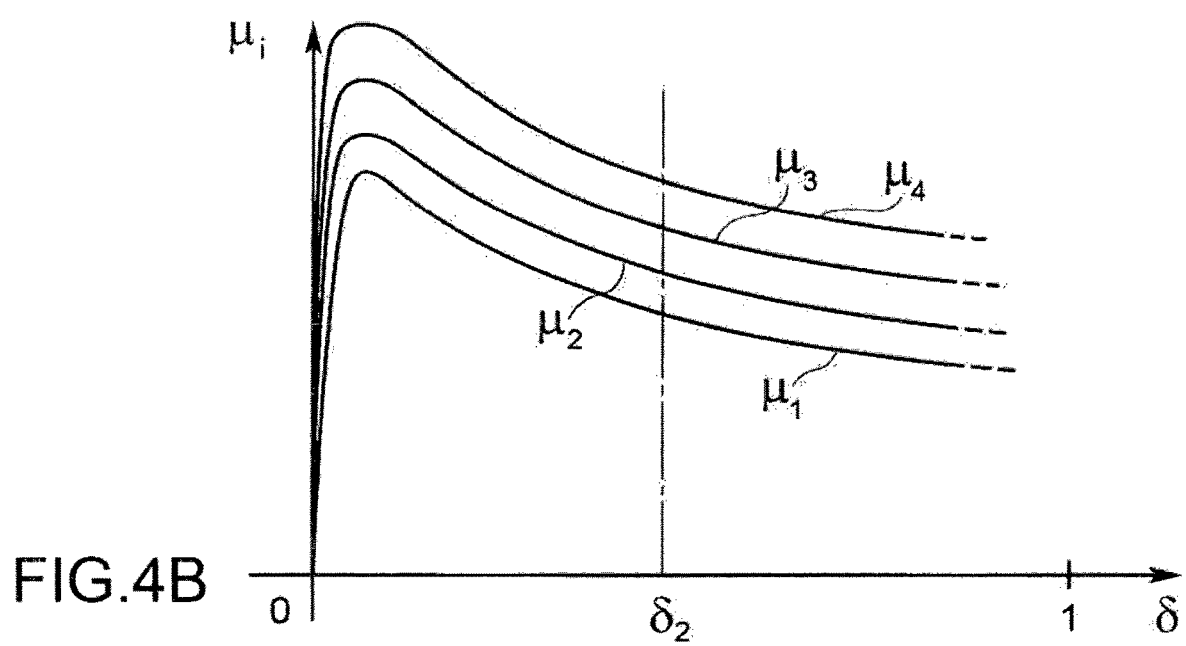
Figure 4C:
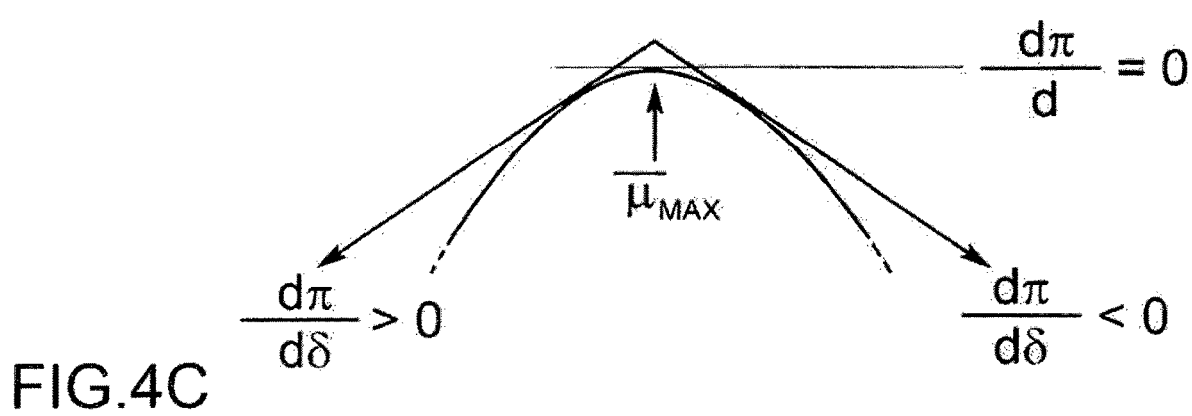
FIG. 4C illustrates the trend of an average adhesion curve $\bar{\mu}$ around the peak value.

Before describing in detail a plurality of embodiments, it should be clarified that the present invention is not limited in its application to the details of construction or to the configuration of the components provided in the following description or illustrated in the drawings. The invention may assume other embodiments and may be implemented or achieved in essentially different ways. It should also be understood that the phraseology and terminology have descriptive purposes and should not be construed as limiting. The use of "include" and "comprise" and the variations thereof are to be understood as encompassing the elements stated hereinafter and the equivalents thereof, as well as additional elements and the equivalents thereof.

The method according to the present invention allows to determine the position of the adhesion peak along the adhesion curves of the wheels belonging to a plurality of controlled axles of a vehicle, and, consequently, to obtain improved control and possible recovery of the adhesion of the wheels of a controlled axle of a railway vehicle.

Figure 5:
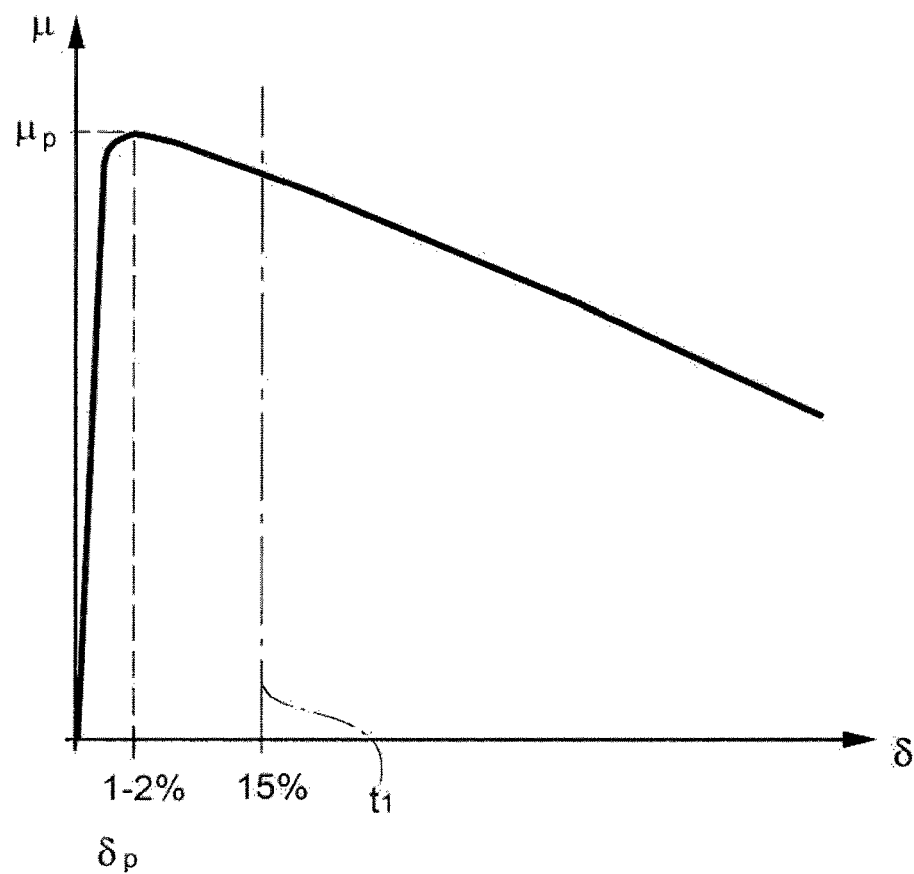
FIG. 5 is a graph illustrating an adhesion curve having an adhesion peak at a sliding value lower than the first predetermined threshold.

Initially referring to adhesion curves shown in FIG. 5, the adhesion peak $\mu_p$ is obtained for small sliding values of the order of 1-2%.

Defining $\delta_p$ as the sliding value for which the adhesion peak $\mu_p$ is obtained, it is clear that:
- if the axle is brought to slide close to $\delta_p$ (small slide), there will be a negligible cleaning effect to the benefit of the local adhesion which assumes the peak value $\mu_p$.
- conversely, if the axle is brought to slide at higher sliding values $\delta$, there will be a loss of local adhesion to the benefit of a possible cleaning effect for the following axles. Such effect will be more or less effective depending on the type and amount of contaminant present. The effectiveness of the cleaning is an unknown datum a priori.

In order to maximize the average adhesion of the axles, two factors should be considered when choosing sliding points to make the axles work:
- benefit of cleaning on the following axles (increasing as the local sliding increases); and
- local adhesion value (decreasing as the sliding increases).

Figure 6:
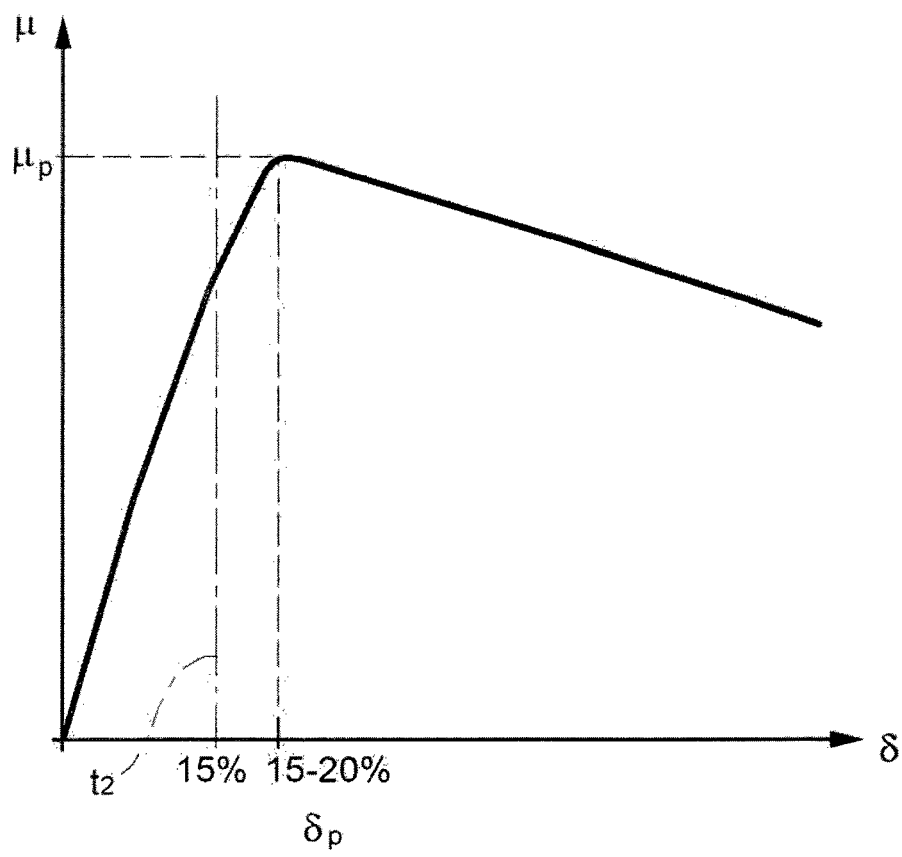
FIG. 6 is a graph illustrating an adhesion curve having an adhesion peak at a sliding value greater than the second predetermined threshold.

Conversely, in case of an adhesion curve as shown FIG. 6, literature and results of experimental tests carried out on rolling stock, demonstrate that the trend of the adhesion curves depends on many factors, among which, type and amount of contaminant, and weight of the vehicle. Not all adhesion curves necessarily exhibit an adhesion peak $\mu_p$ for small sliding values, such as that of FIG. 5. There are cases wherein the adhesion peak $\mu_p$ is obtained for higher sliding values ($\delta_p \approx 20\%$), like the curve in FIG. 6.

In such case:
- if the axle is brought to slide at small sliding values (e.g. $\delta = 1\text{-}2\%$), the cleaning effect will be practically zero and the local adhesion will be reduced with respect to the peak value.
- conversely, if the axle is brought to slide at higher values $\delta$ (e.g. $\delta \approx 20\%$), there will be a benefit both on the local adhesion and on a possible cleaning effect for the following axles.

In the case of adhesion curves such as those of FIG. 6, therefore, regardless of the effectiveness of the cleaning, the most appropriate choice is to bring all the axles into large slides ($\delta \approx 20\% \approx \delta_p$) maximizing both the local adhesion and the possible cleaning effect.

Based on the above concepts, the method for assessing contamination of a rail, particularly for a railway vehicle, comprises the steps of:
- imposing a first sliding value $\delta_1$ lower than a first predetermined threshold $t_1$ between the wheels $W_1$ of a first controlled axle $A_1$ of a railway vehicle and the rail, the first controlled axle $A_1$ being the head axle of the railway vehicle according to the direction of travel of the railway vehicle;
- imposing a second sliding value $\delta_2$ greater than a second predetermined threshold $t_2$ between the wheels of a second controlled axle $A_2$ and the rail, the second axle $A_2$ being the axle following said first axle $A_1$ according to the direction of travel of the train, and the second predetermined threshold $t_2$ being greater than said first predetermined threshold $t_1$;
- determining the trend of the adhesion curve between the wheels W belonging to a plurality of controlled axles $A_n$ of the railway vehicle and the rail based on a first adhesion value $\mu_1$ between the wheels of said first axle $A_1$ and the rail, and a second adhesion value $\mu_2$ between the wheels of said second axle $A_2$ and the rail.

The step of determining the trend of the adhesion curve between the wheels W belonging to a plurality of controlled axles $A_n$ of the railway vehicle and the rail may comprise the steps of measuring the first adhesion value $\mu_1$ between the wheels of said first axle $A_1$ and the rail, and the second adhesion value $\mu_2$ between the wheels of said second axle $A_2$ and the rail;
- if the second adhesion value $\mu_2$ is greater than the first adhesion value $\mu_1$, determining that the adhesion curve between the wheels W belonging to the plurality of controlled axles $A_n$ of a railway vehicle and the rail is an adhesion curve having an adhesion peak $\mu_p$ at a sliding value $\delta_p$ greater than the second predetermined threshold $t_2$; and
- if the second adhesion value $\mu_2$ is lower than the first adhesion value $\mu_1$, determining that the adhesion curve between the wheels W belonging to a plurality of controlled axles $A_n$ of a railway vehicle and the rail is an adhesion curve having an adhesion peak $\mu_p$ at a sliding value $\delta_p$ lower than said first predetermined threshold $t_1$.

By way of example, the first predetermined threshold $t_1$ may coincide with a sliding value of about 5%, and the first sliding value $\delta_1$ less than the first predetermined threshold between the wheels of a first controlled axle $A_1$ and a rail may be about 1-2%. The second predetermined threshold $t_2$ may coincide with a sliding value between about 15% and 25%, and the second sliding value $\delta_2$, greater than the second predetermined threshold between the wheels of at least one second controlled axle $A_2$ and the rail may be comprised between 20%-25%.

Preferably, the second sliding value $\delta_2$ does not exceed a limit sliding value $\delta_{limit}$ equal to about 25%.

The method for assessing contamination of a rail, if it has been determined that the adhesion curve between the wheels W belonging to a plurality of controlled axles $A_n$ of a railway vehicle and the rail is an adhesion curve having an adhesion peak $\mu_p$ at a sliding value greater than the second predetermined threshold $t_2$, may comprise the step of:
- imposing a sliding value $\delta$ greater than the second predetermined threshold $t_2$ between the wheels of all controlled axles and the rail.

On the other hand, the method for assessing contamination of a rail, if it has been determined that the adhesion curve between the wheels W belonging to the plurality of controlled axles $A_n$ of a railway vehicle and the rail is an adhesion curve having an adhesion peak $\mu_p$ at a sliding value $\delta_p$ less than the first predetermined threshold $t_1$, may comprise the steps of:
- calculating the value of the adhesion difference $\Delta\mu_{slide}$ by means of the difference between the first adhesion value $\mu_1$ and the second adhesion value $\mu_2$;
- imposing the second sliding value $\delta_2$ greater than a second predetermined threshold $t_2$ between the wheels of at least one third axle $A_3$ and the rail, the at least one third axle $A_3$ being the axle following said second axle $A_2$ according to the direction of travel of the train;

calculating the value of the adhesion difference $\Delta\mu_{clean}$ generated by the cleaning effect of the wheels of the second axle $A_2$ to the benefit of the wheels of the third axle $A_3$, said value of the adhesion difference $\Delta\mu_{clean}$ generated by the cleaning effect being obtained by means of the difference between the adhesion value $\mu_3$ between the wheels of the third axle $A_3$ and the rail, and the adhesion value $\mu_2$ between the wheels of the second axle $A_2$ and the rail;

imposing a sliding value $\delta$ greater than the second predetermined threshold $t_2$ between the wheels W of all the controlled axles $A_1, \ldots, A_n$ and the rail, if the value of the adhesion difference $\Delta\mu_{clean}$ generated by the cleaning effect of the wheels is predominant with respect to the value of the adhesion difference $\Delta\mu_{slide}$ multiplied by an adaptive factor $F_{ad}$, the value of which is inversely proportional to the number of axles;

imposing a sliding value $\delta$ lower than the first predetermined threshold $t_1$ between the wheels W of all the controlled axles $A_1, \ldots, A_n$ and the rail, if the value of the adhesion difference $\Delta\mu_{clean}$ generated by the cleaning effect of the wheels is not predominant with respect to the value of the adhesion difference $\Delta\mu_{slide}$ multiplied by an adaptive factor $F_{ad}$ the value of which is inversely proportional to the number of axles.

The method for assessing contamination of a rail, if it has been determined that the adhesion curve of the wheels W belonging to a plurality of controlled axles $A_n$ of a railway vehicle is an adhesion curve having an adhesion peak $\mu_p$ at a sliding value $\delta_p$ less than the first predetermined threshold $t_1$, may comprise the step of:

after having imposed a second sliding value $\delta_2$ greater than the second predetermined threshold $t_2$ between the wheels of all the controlled axles $A_1, \ldots, A_0$ and the rail, due to the non-predominance of the value of the adhesion difference $\Delta\mu_{clean}$ generated by the cleaning effect of the wheels with respect to the value of the adhesion difference $\Delta\mu_{slide}$ multiplied by an adaptive factor $F_{ad}$ the value of which is inversely proportional to the number of axles, if the adhesion value $\mu_n$ of the wheels of a previous axle $A_n$ is coincident with the adhesion value $\mu_{n+1}$ of the wheels of the next axle $A_{n+1}$, imposing a first sliding value $\delta_1$ lower than the first predetermined threshold $t_1$ between the wheels of at least one following axle $A_{n+1}, A_{n+2}, \ldots$ and the rail.

Due to this last step described above, it may be noted that the cleaning effect of the rail that was exhibited in the first axles according to the direction of travel no longer involves an increase in adhesion for the following axles (for example, because now the rail is completely clean), and consequently, it is appropriate to impose on the following axles the sliding value corresponding to the adhesion peak and not a sliding value useful for cleaning the rail.

By way of example, considering the second axle as the previous axle $A_n$ and the at least one third axle as the following axle $A_{n+1}$, after having imposed a second sliding value $\delta_2$ greater than the second predetermined threshold $t_2$ between the wheels of all the controlled axles and the rail, due to the non-predominance of the value of the adhesion difference $\Delta\mu_{clean}$ generated by the cleaning effect of the wheels with respect to the value of the adhesion difference $\Delta\mu_{slide}$ multiplied by an adaptive factor $F_{ad}$, a first sliding value $\delta_1$ may be imposed less than the first predetermined threshold $t_1$ between the wheels of the axles following the third and the rail, if the adhesion value $\mu_2$ of the wheels of the second axle $A_2$ (previous axle $A_n$) coincides with the adhesion value $\mu_3$ of the wheels of the at least one third axle (following axle $A_{n+1}$).

By way of example, the method for assessing contamination of a rail may be repeated after a predetermined time interval (for example every 30 seconds) or it may be repeated after a predetermined distance has been traveled by the railway vehicle.

The present invention comprises moreover a method for assessing cleaning of a rail for a railway vehicle, comprising the steps of:

imposing a first sliding value $\delta_1$ lower than a first predetermined threshold $t_1$ between the wheels $W_1$ of a first controlled axle $A_1$ of a railway vehicle and the rail; the first controlled axle $A_1$ being the head axle of the railway vehicle according to the direction of travel of the railway vehicle;

imposing a second sliding value $\delta_2$ greater than a second predetermined threshold $t_2$ between the wheels of a second controlled axle $A_2$ and the rail, the second axle $A_2$ being the axle following said first axle $A_1$ according to the direction of travel of the train, and said second predetermined threshold $t_2$ being greater than said first predetermined threshold $t_1$;

imposing a third sliding value $\delta_3$ equal to said second sliding value $\delta_2$ between the wheels of a controlled third axle $A_3$ and the rail, the third axle $A_3$ being the axle following said second axle $A_2$ according to the direction of travel of the train;

determining the effectiveness of the cleaning of the rail generated by the sliding of the second axle $A_2$ to the benefit of the third axle $A_3$ based on a first adhesion value $\mu_2$ between the wheels of said second axle $A_2$ and the rail and a second adhesion value $\mu_3$ between the wheels of said third axle $A_3$ and the rail.

The aforesaid step of determining the effectiveness of the cleaning of the rail may comprise the steps of:

measuring the first adhesion value $\mu_2$ and the second adhesion value $\mu_3$; and determining the effectiveness of the cleaning by performing a subtraction operation between the second adhesion value $\mu_3$ and the first adhesion value $\mu_2$.

In the following is reported by way of example, an illustrative case wherein the total number of axles of the railway vehicle is four.

Figure 7:
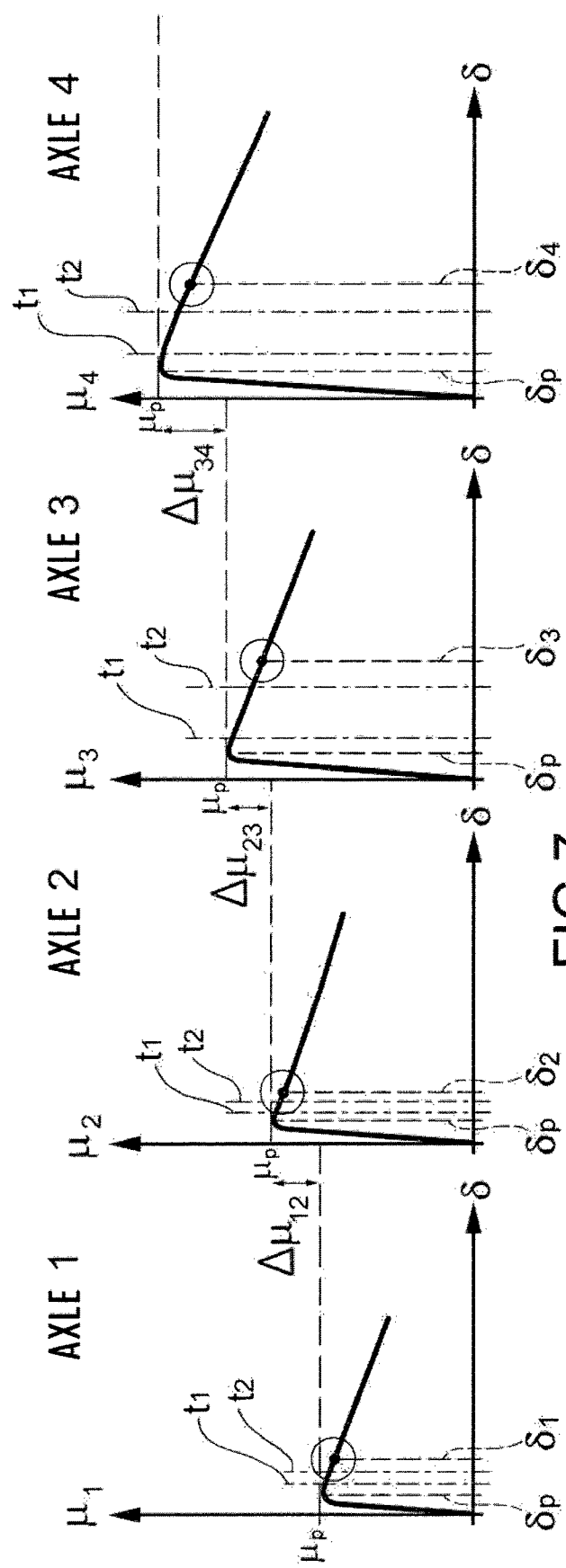
FIG. 7 shows four adhesion curves, respectively of wheels belonging to four consecutive axles, in case of a cleaning effect of the rail.

Considering FIG. 7, it is possible to assess the adhesion engaged by the four axles making up the railway vehicle.

The adhesion $\mu_1$ available for the first axle $\delta_1$ is not influenced by the cleaning, such axle being the first to encounter the rail. The adhesion $\mu_1$ depends only on the conditions of the rail, i.e. the ambient/contaminant conditions that will be indicated in the following with "amb".

The adhesion $\mu_1$ engaged by the first axle is a function of the local sliding $\delta_1$ of the first axle on the rail:

$$\mu_1 = f(\mu_{max}, \delta_1) = f(\text{amb}, \delta_1)$$

Conversely, the adhesion $\mu_2$ available for the second axle depends on the cleaning produced by the previous first axle $(\Delta\mu_{12})$.

$$\mu_{2,max} = \mu_{max} + \Delta\mu_{12}$$

The cleaning produced by the first axle in favor of the second axle $\Delta\mu_{12}$ is a function of the sliding $\delta_1$ of the first axle on the rail, as well as of the cleaning characteristics typical of the contaminant (contaminant more or less easy to remove with the same sliding), which are indicated hereinafter with the term "cleaning".

$$\mu_{2,max} = \mu_{max} + f(\text{clean}, \delta_1)$$

The adhesion $\mu_2$ engaged by the second axle is a function of the local sliding $\delta_2$ of the second axle on the rail.

$$\mu_2 = f(\mu_{2,max}, \delta_2) = f(amb, \delta_1, cleaning, \delta_2)$$

Likewise, the adhesion $\mu_3$ engaged by the at least one third axle depends on the local sliding $\delta_3$ and on the cleaning produced by the previous axles, hence by $\delta_1$, $\delta_2$ and by cleaning.

Likewise, the adhesion $\mu_4$ engaged by the fourth axle depends on the local sliding $\delta_4$ and on the cleaning produced by the previous axles, hence by $\delta_1$, $\delta_2$, $\delta_3$ and by the cleaning.

According to these considerations:

$$\mu_{average} = \frac{1}{4} * (f(amb, \delta_1) + f(amb, \delta_1, \delta_2, cleaning) + f(amb, \delta_1, \delta_2, \delta_3, cleaning) + f(amb, \delta_1, \delta_2, \delta_3, \delta_4, cleaning))$$

Figure 8:
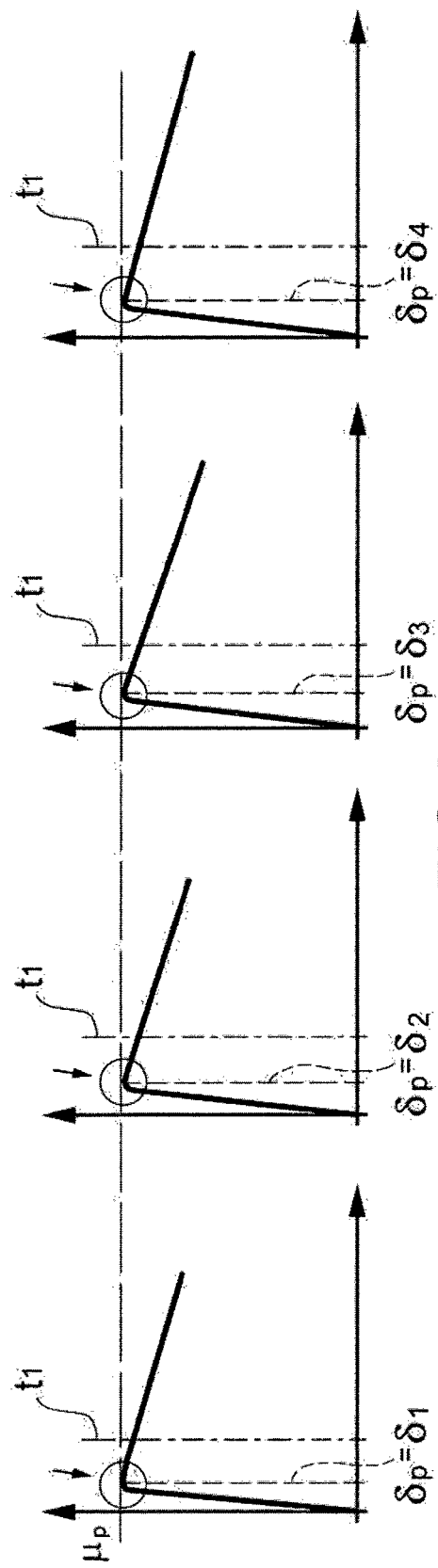
FIG. 8 shows four adhesion curves respectively of wheels belonging to four consecutive axles, in the case wherein the sliding value is imposed to correspond with the adhesion peak between the wheels of the axles and the rail, and consequently there is no cleaning effect of the rail.

In the case of an adhesion curve such as the one illustrated in FIG. 5, and in the case wherein a sliding corresponding to the adhesion peak $\mu_p$ is imposed on all the axles, assuming (see FIG. 8) control of all axles on the adhesion peak $\mu_p$, that is, at small slides around $\delta_p$, no rail cleaning is produced.

$$\Delta\mu_{12} = \Delta\mu_{23} = \Delta\mu_{34} = 0$$

and therefore $$\mu_{2,max} = \mu_{3,max} = \mu_{4,max} = \mu_{1,max}$$

All the axles thus find the same adhesion as the head axle finds (first axle in the direction of travel), as no axle cleans the rail.

Thus:

$$\mu_{average} = \mu_{1,max}$$

In the case of an adhesion curve such as that of FIG. 5, wherein on all the axles a slide of $\delta \gg \delta p$ is imposed, it is possible to obtain a cleaning effect (this effect is certainly not a priori but rather depends on the effectiveness of the cleaning on the contaminant in question: parameter previously defined as cleaning).

Figure 9:
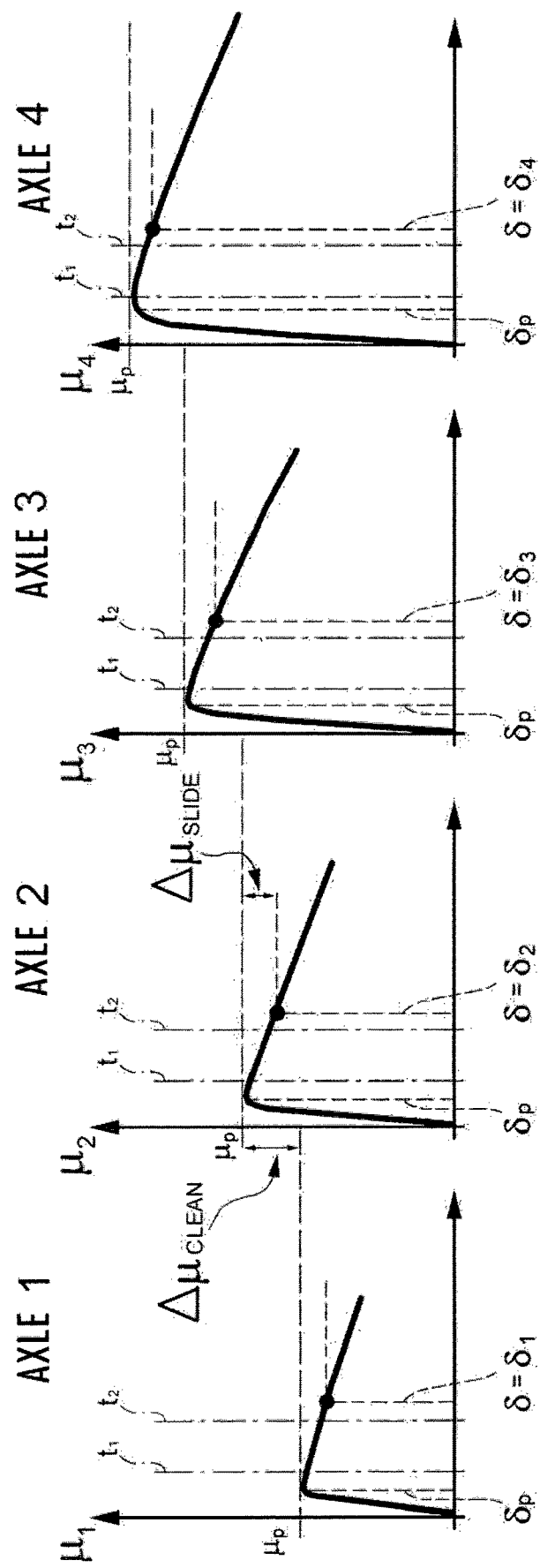
FIG. 9 shows four adhesion curves respectively of wheels belonging to four consecutive axles, in the case wherein the adhesion curve of the wheels belonging to a plurality of controlled axles of a railway vehicle exhibits an adhesion peak at a sliding value lower than the first predetermined threshold, and the sliding value imposed between the wheels of the axles and the rails is a higher sliding value than the second predetermined threshold.

With reference to FIG. 9:

$$\Delta\mu_{12} = \Delta\mu_{23} = \Delta\mu_{34} = \Delta\mu_{clean}$$

Therefore:

$$\mu_{2,max} = \mu_{1,max} = \Delta\mu_{clean}$$

$$\mu_{3,max} = \mu_{2,max} = \Delta\mu_{clean} = \mu_{1,max} = 2*\Delta\mu_{clean}$$

$$\mu_{4,max} = \mu_{3,max} = \Delta\mu_{clean} = \mu_{1,max} = 3*\Delta\mu_{clean}$$

At the same time, each axle, sliding at a $\delta$ far from the peak value $\delta_p$, will not exploit all the locally available adhesion $\mu$.

With reference to FIG. 9:

$$\mu_1 = \mu_{1,max} - \Delta\mu_{slide}$$

$$\mu_2 = \mu_{2,max} - \mu\Delta_{slide} = \mu_{1,max} + \Delta\mu_{clean} - \Delta\mu_{slide}$$

$$\mu_3 = \mu_{3,max} - \mu\Delta_{slide} = \mu_{1,max} + 2*\Delta\mu_{clean} - \Delta\mu_{slide}$$

$$\mu_4 = \mu_{4,max} - \mu\Delta_{slide} = \mu_{1,max} + 3*\Delta\mu_{clean} - \Delta\mu_{slide}$$

Calculating the average adhesion of the vehicle:

$$\mu_{average} = \mu_{1,max} + 3/2*\Delta\mu_{clean} - \Delta\mu_{slide}$$

Comparing the average adhesion obtained in the case of an adhesion curve such as the one illustrated in FIG. 5, in the case wherein on all the axles a slide corresponding to the adhesion peak is imposed, and in the case wherein on all the axles a slide of $\delta \gg \delta_p$ is imposed, one notes that:

If $\Delta\mu_{clean} > \frac{2}{3} * \Delta\mu_{slide}$, it is appropriate to control the axles in large slides of $\delta \gg \delta_p$, i.e. with a slide greater than the second predetermined threshold $t_2$.

If $\Delta\mu_{clean} > \frac{2}{3} * \Delta\mu_{slide}$, it is appropriate to control the axles with reduced sliding $\delta = \delta_p$, i.e. with a slide less than the first predetermined threshold $t_1$.

In the examples given above, the adaptive factor is equal to $\frac{2}{3}$. For example, in the case of five axles, the adaptive factor is equal to $\frac{1}{2}$.

In the case of adhesion curves such as those of FIG. 6, regardless of the effectiveness of cleaning, the most appropriate choice is to bring all the axles into large slides, that is, with a slide greater than the second predetermined threshold $t_2$ ($\delta \approx 20\% \approx \delta_p$) consequently maximizing both the local adhesion and the possible cleaning effect.

Figure 10:
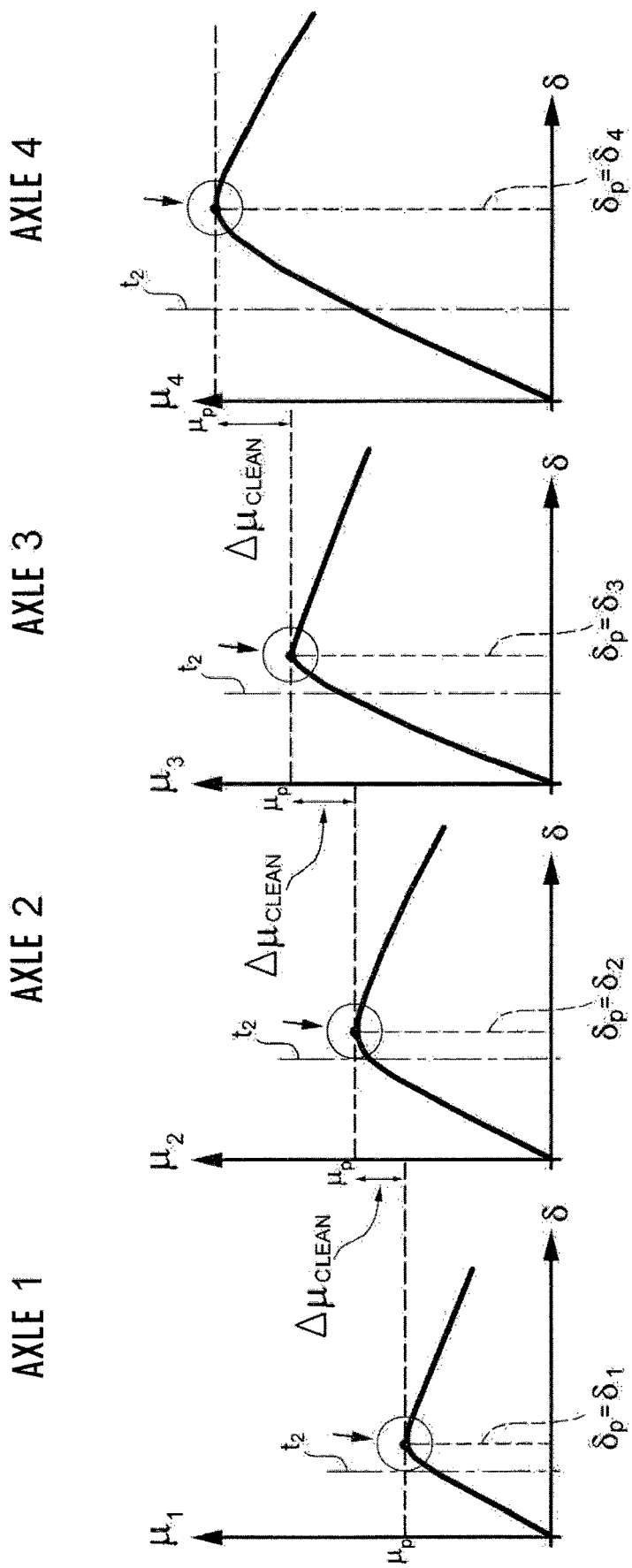
FIG. 10 shows four adhesion curves respectively of wheels belonging to four consecutive axles, in the case wherein the adhesion curves exhibit an adhesion peak at a sliding value greater than the second predetermined threshold and the sliding value imposed between the wheels of the axles and the rails is a higher sliding value than the second predetermined threshold.

According to such management of the sliding points we have (see FIG. 10):

$$\mu_1 = \mu_{1,max}$$

$$\mu_2 = \mu_{1,max} + \Delta\mu_{clean}$$

$$\mu_3 = \mu_{1,max} + 2*\Delta\mu_{clean}$$

$$\mu_4 = \mu_{1,max} + 3*\Delta\mu_{clean}$$

Thus, the average vehicle-level adhesion is:

$$\mu_{average} = \mu_{1,max} + 3/2*\Delta\mu_{clean}$$

From the analysis of the preceding cases, (case of an adhesion curve such as the one illustrated in FIG. 5 and wherein on all the axles a slide is imposed corresponding to the adhesion peak, the case of an adhesion curve such as the one of FIG. 5 wherein on all the axles a slide of $\delta \ll \delta_p$ is imposed, and the case of adhesion curves such as those in FIG. 6), it may be noted that the choice of the optimal sliding point (the one that maximizes the average adhesion of the vehicle) must pass through the assessment of three main factors:

FACTOR 1: Type of adhesion curve: i.e. if the adhesion peak is obtained for small sliding values (FIG. 5), i.e. for a slide less than the first predetermined threshold $t_1$, or for large sliding values (FIG. 6), i.e. for a slide greater than the second predetermined threshold $t_2$, close to $\delta_{limit}$;

FACTOR 2: $\Delta\mu_{slide}$ (parameter defined only for the curve illustrated in FIG. 5), i.e. difference in adhesion between the peak of the curve and the adhesion engaged with a slide close to the limit slide (see FIG. 9).

FACTOR 3: $\Delta\mu_{clean}$, i.e. the effectiveness of the cleaning effect from which the axle (n+1) benefits when the axle n is made to slide with a slide greater than the second predetermined threshold $t_2$, close to $\delta_{limit}$.

In the case of a railway vehicle moving on rails, the assessment of these three factors and the consequent choice of the sliding point, according to the criteria described above, must take place in real time during the braking of the vehicle in order to maximize the average adhesion engaged by the vehicle, thereby maximizing the deceleration of the vehicle and thereby minimizing the stopping distance of the vehicle.

To assess the effectiveness of cleaning (FACTOR 3) it is therefore necessary to impose a significant slide, i.e. a slide greater than the second predetermined threshold $t_2$ ($\delta \approx \delta_{limit}$) on the axle n and to verify the potential gain of adhesion on the axle (n+1).

At the same time, by sliding the axle with a slide greater than the second predetermined threshold $t_2$, close to $\delta_{limit}$, the rail conditions are modified for the following axles and it becomes impossible to assess the adhesion value relative to small slides, i.e. with a slide less than the first predetermined threshold $t_1$ ($\delta$<5%). Therefore, factors 1 and 2 cannot be assessed.

The object of the invention is to manage the sliding of the vehicle axles as follows:
FIRST AXLE: $\delta 1 \approx 1\text{-}2\%$
SECOND AXLE: $\delta 2 \approx 20\%$
THIRD AXLE: $\delta 3 = \delta 2 \approx 20\%$
FOURTH AXLE: optional The first axle, the head axle, is controlled in a small slide. In this way, by measuring the adhesion engaged by the first axle, the adhesion value relative to small slides is obtained $$\mu_1 = (1\text{-}2\%)$$

without producing cleaning, i.e. without changing the characteristics of the rail for following axles.

The second axle, on the other hand, is controlled in a significant slide, i.e. greater than the second predetermined threshold $t_2$. In this way, by measuring the adhesion engaged by the second axle, the adhesion value relative to large slides is obtained $$\mu_2 = \mu(20\%)$$

producing a possible cleaning for the following axle, cleaning that will depend on the characteristics of the contaminant (cleaning factor 3).

The third axle is controlled at the same sliding value imposed for the second axle.

In this way, by measuring the adhesion engaged by the third axle, it is possible to assess the effectiveness of the cleaning by calculating the cleaning factor:

$$\Delta\mu_{clean} = \mu_3 - \mu_2$$

Moreover, by comparing the measured adhesion for the first and second axles, the type of adhesion curve may be determined (FACTOR 1) and possibly $\Delta\mu_{slide}$ (FACTOR 2) may calculated.

If ($\mu_2 > \mu_1$), it is a case of an adhesion curve of the type illustrated in FIG. 6.

The most appropriate choice is therefore that of bringing all the axles into large slides, that is to say, a sliding greater than the second predetermined threshold $t_2$ ($\delta \approx 20\% \approx \delta_{limit}$);

If ($\mu_2 > \mu_1$), it is a case of an adhesion curve of the type illustrated in FIG. 5) and one may calculate:

$$\Delta\mu_{slide} = \mu_1 - \mu_2$$

At this point, noting all the factors, one may choose the optimal sliding point:

If ($\Delta\mu_{clean} > \frac{2}{3} * \Delta\mu_{slide}$)

the most appropriate choice is therefore that of bringing all the axles into large slides, that is to say, a slide greater than the second predetermined threshold $t_2$ ($\delta \approx 20\% \approx \delta_{limit}$);

if ($\Delta\mu_{clean} < \frac{2}{3} * \Delta\mu_{slide}$):

the most appropriate choice is to control the axles on the adhesion peak, i.e. with a slide less than the first predetermined threshold $t_1$ ($\delta$<5%).

The principle of the invention remaining the same, embodiments and details of construction may be varied with respect to those described by way of non-limiting example, without thereby departing from the scope of the invention as described and claimed herein. It is understood, moreover, that each embodiment may be combined with any other embodiment.

The invention claimed is:

1. A method for assessing contamination of a rail, in particular for a railway vehicle, the method comprising the steps of:
imposing a first sliding value lower than a first predetermined threshold between the wheels of a first controlled axle of a railway vehicle and the rail, the first controlled axle being the head axle of the railway vehicle according to a direction of travel of the railway vehicle;
imposing a second sliding value greater than a second predetermined threshold between the wheels of a second controlled axle and the rail, the second axle following said first axle according to the direction of travel of the, railway vehicle and the second predetermined threshold being greater than said first predetermined threshold;
determining trend of an adhesion curve between the wheels belonging to a plurality of controlled axles of the railway vehicle and the rail, based on a first adhesion value between the wheels of said first axle and the rail, and a second adhesion value between the wheels of said second axle and the rail.

2. The method of claim 1, wherein the step of determining the trend of the adhesion curve between the wheels belonging to a plurality of controlled axles of a railway vehicle and the rail comprises the steps of:
measuring the first adhesion value between the wheels of said first axle and the rail, and the second adhesion value between the wheels of said second axle and the rail;
determining that the adhesion curve between the wheels belonging to the plurality of controlled axles of a railway vehicle and the rail is an adhesion curve having an adhesion peak at a sliding value greater than the second predetermined threshold, if the second adhesion value is greater than the first adhesion value; and
determining that the adhesion curve between the wheels belonging to a plurality of controlled axles of a railway vehicle and the rail is an adhesion curve having an adhesion peak at a sliding value lower than said first predetermined threshold, if the second adhesion value is lower than the first adhesion value.

3. The method of claim 2, wherein:
a) if it has been determined that the adhesion curve between the wheels belonging to a plurality of controlled axles of a railway vehicle and the rail is an adhesion curve having an adhesion peak at a sliding value greater than the second predetermined threshold, said method comprises the step of:
imposing a sliding value greater than the second predetermined threshold between the wheels of all controlled axles and the rail;
b) if it has been determined that the adhesion curve between the wheels belonging to the plurality of controlled axles of a railway vehicle and the rail is an adhesion curve having an adhesion peak at a sliding value lower than the first predetermined threshold, said method further comprises the steps of:
calculating a value of an adhesion difference by means of the difference between the first adhesion value and the second adhesion value;
imposing the second sliding value greater than the second predetermined threshold between the wheels of at least one third axle and the rail; said at least one third axle following said second axle according to the direction of travel of the train;

calculating a value of an adhesion difference generated by a cleaning effect of the wheels of the second axle to the benefit of the wheels of the third axle; said value of the adhesion difference generated by the cleaning effect being obtained by means of the difference between a third adhesion value between the wheels of the third axle and the rail, and the second adhesion value between the wheels of the second axle and the rail;

imposing a sliding value greater than the second predetermined threshold between the wheels of all controlled axles and the rail, if the value of the adhesion difference generated by the cleaning effect of the wheels is predominant with respect to the value of the adhesion difference multiplied by an adaptive factor the value of which is inversely proportional to the number of axles;

imposing a sliding value lower than the first predetermined threshold between the wheels of all controlled axles and the rail, if the value of the adhesion difference generated by the cleaning effect of the wheels is not predominant with respect to the value of the adhesion difference multiplied by an adaptive factor the value of which is inversely proportional to the number of the axles.

4. The method of claim 3, wherein if it has been determined that the adhesion curve of the wheels belonging to a plurality of controlled axles of a railway vehicle is an adhesion curve having an adhesion peak at a sliding value lower than the first predetermined threshold, said method further comprises the step of:

after having imposed a second sliding value greater than the second predetermined threshold between the wheels of all controlled axles and the rail, due to non-predominance of the value of the adhesion difference generated by the cleaning effect of the wheels with respect to the value of the adhesion difference multiplied by an adaptive factor the value of which is inversely proportional to the number of axles, if the adhesion value of the wheels of a previous axle is coincident with the adhesion value of the wheels of the next axle, imposing a first sliding value lower than the first predetermined threshold between the wheels of at least one following axle and the rail.

5. The method of claim 1, wherein the method for assessment of contamination of a rail is repeated after a predetermined time interval.

6. The method of claim 1, wherein the method for assessment of contamination of a rail is repeated after a predetermined distance has been traveled by the railway vehicle.

7. The method of claim 1, wherein the first predetermined threshold has a sliding value lower than 5%, and the second predetermined threshold has a sliding value comprised between 15% and 25%.

8. A method for assessing cleaning of a rail for a railway vehicle, comprising the steps of:

imposing a first sliding value lower than a first predetermined threshold between the wheels of a first controlled axle of a railway vehicle and the rail, the first controlled axle being the head axle of the railway vehicle according to a direction of travel of the railway vehicle;

imposing a second sliding value greater than a second predetermined threshold between the wheels of a second controlled axle and the rail; the second axle following said first axle according to the travel direction of the railway vehicle, and said second predetermined threshold being greater than said first predetermined threshold;

imposing a third sliding value equal to said second sliding value between the wheels of at least one third axle and the rail; said at least one third axle following said second axle according to the travel direction of the railway vehicle;

determining effectiveness of the cleaning of the rail generated by the sliding of the second axle to the benefit of the at least one third axle based on a first adhesion value between the wheels of said second axle and the rail and a second adhesion value between the wheels of said at least one third axle and the rail.

9. The method of claim 8, wherein the step of determining the effectiveness of the cleaning of the rail comprises the steps of:

measuring the first adhesion value and the second adhesion value; and determining the effectiveness of the cleaning by performing a subtraction operation between the second adhesion value and the first adhesion value.

* * * * *